United States Patent [19]

Hunt et al.

[11] Patent Number: 5,781,892

[45] Date of Patent: Jul. 14, 1998

[54] METHOD AND APPARATUS FOR INTERACTING WITH A COMPUTER RESERVATION SYSTEM

[75] Inventors: Douglas J. Hunt, Seattle; George A. Smith, Kent, both of Wash.; Wayne L. Flake, Plano, Tex.

[73] Assignee: Electronic Data Systems Corporation, Plano, Tex.

[21] Appl. No.: 557,508

[22] Filed: Nov. 13, 1995

[51] Int. Cl.$^6$ .................................................. G06F 17/30
[52] U.S. Cl. .............................. 705/5; 705/5; 705/6
[58] Field of Search ..................... 705/5, 6; 340/825.28

[56] References Cited

U.S. PATENT DOCUMENTS 5,237,499  8/1993  Garback ............................ 364/407

*Primary Examiner*—Emanuel Todd Voeltz
*Assistant Examiner*—Phillip Groutt
*Attorney, Agent, or Firm*—David G. Wille; L. Joy Griebenow

[57] ABSTRACT

A method and apparatus is disclosed for interacting with a computer reservation system. A client computer (12) generates commands in response to user input. A server computer (14) receives the commands and generates requests to a computer reservation system through application program interfaces responsive to the commands. After receiving sets of reservation data from the computer reservation system in response to the requests, the received data is normalized and selected portions are returned to the client computer (12).

27 Claims, 2 Drawing Sheets

METHOD AND APPARATUS FOR INTERACTING WITH A COMPUTER RESERVATION SYSTEM

TECHNICAL FIELD OF THE INVENTION

This invention relates generally to computer reservation systems and more particularly to a method and apparatus for communicating with a computer reservation system.

BACKGROUND OF THE INVENTION

Travel agents use computer reservation systems (CRS's) to make reservations with airlines, hotels, rental car agencies, bus lines, and railroads. Examples of computer reservation systems include the Sabre™ system associated with American Airlines, System One™ associated with Continental Airlines, Apollo™ associated with United Airlines and U.S. Air, and Worldspan™ associated with Delta Airlines, TWA, and Northwest Airlines. Travel agents also use systems known as host systems to make travel reservations. A host system is similar to a computer reservation system but normally only allows a travel agent to make reservations with one particular company. For example, Southwest Airlines has a host system for making airline reservations solely for Southwest Airlines. For purposes of this application, the term "computer reservation system" encompasses both computer reservation systems and host systems.

Unfortunately, a user normally must interact with a computer reservation system using a series of cryptic, hard to understand codes. These codes normally comprise a series of ASCII characters. Thus, most existing computer reservation systems are not user friendly and can be difficult to use.

Because users of most existing computer reservation systems need to interact with those systems through hard to understand codes, travel agencies make a significant investment of time and money in training travel agents to understand the codes. In addition, different computer reservation systems have different codes. Thus, a travel agent needs to learn a number of different code languages if that agent desires to interact with more than one computer reservation system. Learning each new computer reservation system's code language costs the travel agency additional time and money. Moreover, a travel agent can easily become confused when interacting with one of the computer reservation systems because of the variation in code words. A travel agent may erroneously enter a code for one computer reservation system while attempting to interact with a second computer reservation system. Such mistakes decrease the travel agent's efficiency in serving customers.

Existing computer reservation systems may have additional disadvantages. Some existing systems require a travel agency to obtain a terminal address for each simultaneous session that the agency has connected to the reservation system. These sessions usually start when an agent starts work, and end when an agent leaves, thereby requiring one terminal address per agent. This increases the cost of overhead for a travel agency.

A further disadvantage of existing computer reservation systems is that they provide a large amount of extraneous information to a travel agent. For example, a travel agent may know that a particular customer desires a particular airline. Yet, when the travel agent requests available flights for a specific time, the reservation system typically shows the flights available on all airlines at the desired time. Also, a travel agent may have to interact with a computer reservation system a number of times to obtain the desired output.

Most existing computer reservation systems present the user with a series of options when attempting to obtain certain types of information. Several screens of information may be presented to the user before the user finally reaches the correct screen with the desired information. Travel agents are less efficient because they must issue multiple requests to a computer reservation system to retrieve the information they desire. In addition, a travel agent may make typing mistakes during a request, causing him to have to back up several steps.

SUMMARY OF THE INVENTION

The method and apparatus of the present invention allow access to one or more computer reservation systems using a gateway application in a client server environment. One aspect of the invention is a method for interacting with a computer reservation system. A client computer generates a command in response to input from a user. A server computer receives the command through an application program interface (API) and generates a request to a computer reservation system in response to the command. The set of reservation data received from the computer system is normalized and selected portions of the data are returned to the first client computer. (Reservation data includes any type of data received from a computer reservation system.)

The invention has several important technical advantages. Because the invention employs application program interfaces resident on the server to interact with one or more client computers, a single client application can be written to communicate with each computer reservation system. Thus, a travel agent need only learn to use a single, user-friendly application program, rather than cryptic code languages for multiple computer reservation systems. New computer reservation systems may be easily connected to the system as the application program interfaces can be changed to allow communication with the new system. No changes need be made to the client application. A travel agent seeking to use the new computer reservation system does not need to learn a new code language, but can continue to use the same client application program. The travel agency avoids the need to provide additional training when it begins to use a new computer reservation system.

The invention allows filtering of information by the application program interfaces. Thus, the invention may provide a travel agent only the information that he desires. For example, an application program interface can filter airline reservation information and provide the travel agent only with flights available on a specific airline. The filtering feature of the invention increases a travel agent's efficiency as the travel agent receives only the information that he desires. In addition, a travel agent will be less likely to make mistakes such as mistaking one airline for another. Thus, the invention enhances the functionality of existing reservation systems.

As discussed above, a travel agent may need to make multiple requests using various options to obtain desired information from a computer reservation system. The application program interfaces of the current invention can generate this series of commands automatically, avoiding the need for a travel agent to issue multiple requests to obtain certain information. Also, different travel agencies may desire different options to be available for their travel agents. The present invention allows a travel agency to have a client application tailored to its particular needs.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1–5 of the drawings, like numerals being used for like and corresponding parts of the various drawings.

Figure 1:
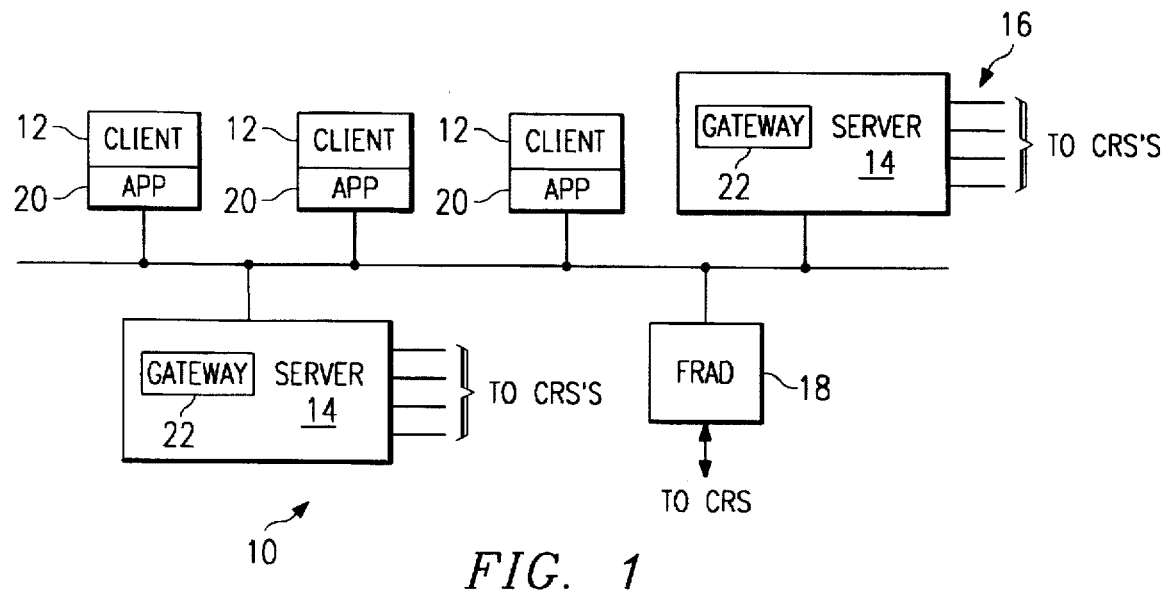
FIG. 1 illustrates a computer network that can be used to access computer reservation systems in accordance with the invention.

FIG. 1 illustrates a computer network 10 that can be used to implement the invention. Computer network 10 comprises one or more client computers 12 connected to one or more server computers 14. Network 10 may also include one or more frame relay access devices 18. In this embodiment, client computers 12, server computers 14, and frame relay access devices 18 communicate with one another using the Tuxedo™ client-server network communications package available from Novell.

A client computer 12 includes a client application 20 that may be used to make commands to one or more computer reservation systems. The commands issued by a client application 20 running on a client computer 12 are received by a gateway application 22. Server 14 connects to one or more computer reservation systems through one or more communications links 16. Communications links 16 may be connections to another computer network, modems, radios, etc. Any type of communication links 16 could be used. Gateway application 22 issues requests and receives datasets from computer reservation systems through communications links 16. Gateway application 22 then processes these datasets, normalizes the data, and returns all, or a selected portion of the data received from the computer reservation system to the client application 20 that issued the command to the gateway application 22.

In an alternative form of communication, a gateway application 22 may communicate with a computer reservation system through a frame relay access device 18. In this example, frame relay access device 18 communicates with other devices in computer network 10 using TCP/IP communications.

The invention allows multiple servers 14 to be connected to computer network 10. Multiple servers 14 may be desirable for sake of redundancy. In addition, due to the limited number of physical connections that can be made to computer reservation systems using communications links 16 from a particular server 14, additional server computers 14 could be used to accommodate a large number of client computers 12.

Client application 20 can make two types of requests to gateway application 22: normalized requests and pass-through requests. When making a normalized request, client application 20 normalizes the command received from the user of client application 20. Gateway application 22 returns data to the client application 20 in a normalized form. In the pass-through mode of operation, a travel agent can make a request to a computer reservation system using the code language for that computer reservation system. Depending upon the format desired by the user of client application 20, gateway application 22 may return data received from a computer reservation system in response to such a request to the client application 20 in either a normalized form or in the code language of the computer reservation system.

The invention also allows gateway application 22 to filter the data received from a computer reservation system and return only selected portions of that data to the client application 20 that issued the command. The filtering feature of the invention will be described more completely in connection with FIGS. 3–5 below.

Figure 2:
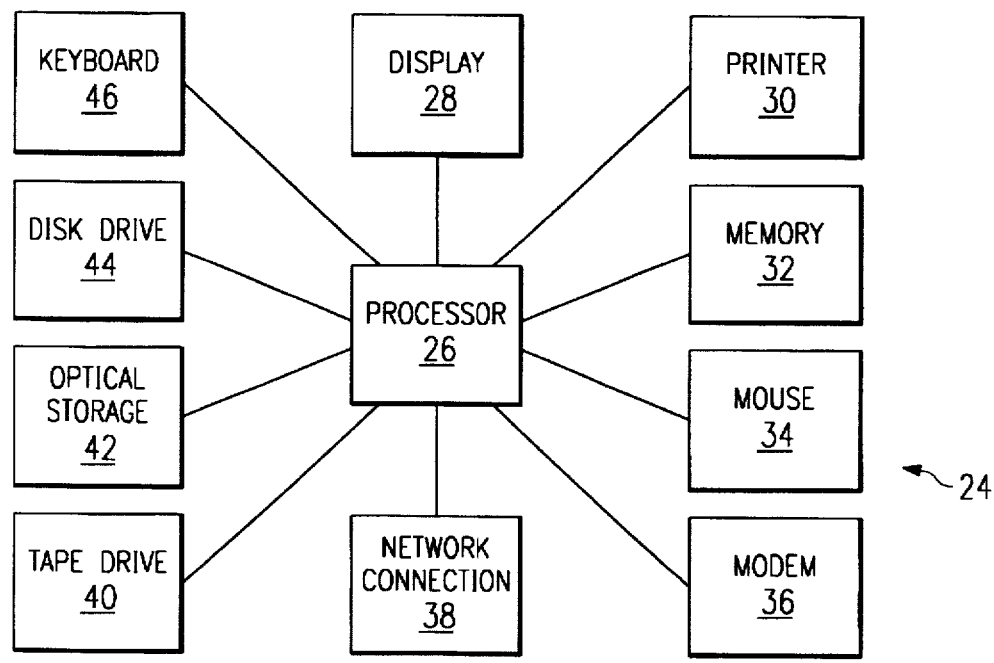
FIG. 2 illustrates a block diagram of a general purpose computer that can be used for one or more of the computers illustrated in FIG. 1.

FIG. 2 illustrates a general purpose computer 24 that can be used for client computers 12 or server computers 14. Computer 24 comprises processor 26, display 28, printer 30, memory 32, mouse 34, modem 36, network connection 38, tape drive 40, optical storage 42, disk drive 44, and keyboard 46. One or more of these components could be omitted from computer 24 and other components could be added. Processor 26 is connected to each of the remaining elements. Display 28 and printer 30 can be used to output data from computer 24. Computer 24 receives input from a user through keyboard 46 and mouse 34. Processor 26 may communicate with other devices through network connection 38 and/or modem 36. Data and software used by computer 24 may be stored in memory 32, tape drive 40, optical storage 42, and/or disk drive 44. Computer 24 will normally be a personal computer such as a personal computer running the Microsoft DOS™ or Microsoft Windows™ operating systems. Computer 24 may also be a computer workstation such as are available from Sun Microsystems or Apollo. In this example, server computer 14 of FIG. 1 comprises a Sparcserver 1000 available from Sun Microsystems.

Figure 3:
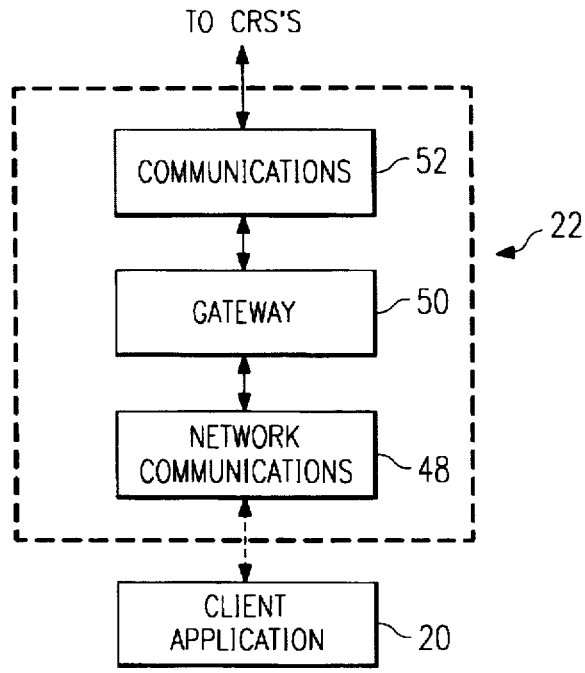
FIG. 3 illustrates a block diagram of a series of processes that can be used to implement the invention.

FIG. 3 illustrates a series of software processes that can be used to implement the present invention. A client application 20 communicates with gateway application 22. Gateway application 22 comprises network communications process 48, gateway process 50, and communications process 52. Network communications process 48 interfaces with client application 20 and gateway process 50. Gateway process 50 interfaces with network communications process 48 and communications process 52. Communications process 52 serves as a communications link between gateway process 50 and the computer reservation systems. Gateway process 50 comprises a series of application program interfaces (API's) that can be accessed by client application 20 through network communications process 48.

In operation, client application 20 generates a command by making a call to a particular application program interface associated with that command. Network communications process 48 handles low level communications between the client application 20 and the gateway application 22 and forwards the command to the appropriate applications program interface in gateway process 50. That application program interface then generates a request to a computer reservation system. Communications process 52 handles low level communications with the appropriate computer reservation system.

After the computer reservation system processes the request, it returns a dataset through communications process 50 to the application program interface which generated the request. That application program interface, which is part of gateway process 50, then returns the dataset to client application 20 using network communications process 48.

As discussed above, the data exchanged between client application 20 and gateway application 22 may be formatted in either a pass-through or normalized fashion. Also, the application program interface may filter the dataset received from a computer reservation system and return only selected portions of the dataset to the client application 20. These features of the invention are discussed more fully in connection with FIG. 4.

Figure 4:
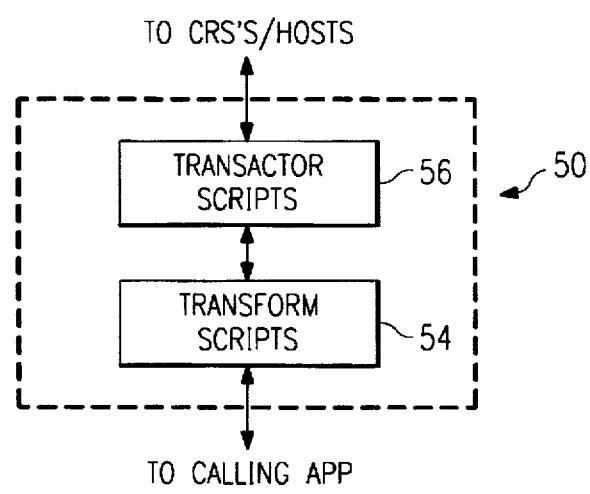
FIG. 4 illustrates a block diagram of the gateway process illustrated in FIG. 3.

FIG. 4 illustrates an example of a gateway process 50 that can be used to implement the present invention. Gateway process 50, as discussed above, comprises a series of application program interfaces. Each application program interface comprises one or more transform scripts 54 and one or more transactor scripts 56. Thus, gateway process 50 comprises a plurality of transform scripts 54 and transactor scripts 56. A transform script 54 handles the data normalization function of gateway process 50. After receiving a command from a client application 20, transform script 54 processes the command and passes it to a transactor script 56. Transactor script 56 then generates a request to the computer reservation system in response to the command. The computer reservation system returns a dataset in response to the request. Transactor script 56 then passes the dataset to transform script 54. Transform script 54 normalizes the dataset and returns the data in normalized form to the calling application 20.

As discussed above, a calling application 20 may issue a pass-through command to a computer reservation system. When a client application 20 issues a pass-through command, transform script 54 simply passes the commands to a transactor script 56 which generates the request to a computer reservation system. Transactor script 56 receives a dataset in response to the request. If the user also desired the data returned in a pass-through fashion, then the transform script 54 simply returns the dataset received from the computer reservation system to the client application 20. Alternatively, transform script 54 may normalize the data and return it to the client application 20.

Gateway process 50 may also filter data that it received from a computer reservation system before returning it to a client application 20. This feature of the invention enhances the functionality of existing computer reservation systems. Filtering can best be understood through the description of several example transactions.

As one example of filtering, suppose that a customer requests a flight at a certain time on one of two preferred airlines. In such a case, the client application 20 issues a command that seeks a flight at the desired time and requests only flights available on the desired preferred airlines. Transform script 54 decodes the command and passes it to transactor script 56. The transactor script 56 then generates a request to a computer reservation system and receives a dataset in response. Suppose that the dataset includes flights available on seven airlines, including one of the two preferred airlines. In this example, transactor script 56 would filter out the six airlines not desired by the customer and return only the flight data for the preferred airline to the client application 20. Transform script 54 would normalize this data before returning it to client application 20.

As a second example, a customer may desire a flight on any airline, but within a short, half-hour time window. In this example, the client application 20 would issue a command to gateway process 50 requesting only flights within the half-hour time window. Transform script 54 would generate the appropriate call to a transactor script 56. Transactor script 56 would generate one or more requests to a computer reservation system and receive one or more datasets in response. Transactor script 56 would then process the data and exclude any data for flights not within the half-hour time window. Data regarding flights within the half-hour time window would be normalized by transform script 54 and returned to the client application 20.

Gateway process 50 may process commands in either a conversational or transactional mode. In the transactional mode, a client application 20 does not need to maintain a running dialog with a computer reservation system. Thus, a client application 20 makes a single application program interface call to the gateway process 50. Gateway process 50 then makes one or more requests to the computer reservation system and receives one or more datasets in response to those requests. An example of a transactional type request would be a request for the available flights between two airports on a particular day and time. In this example, no continuing dialog is required between a user and the computer reservation system.

The invention also supports conversational requests. Sometimes, a user maintains a connection with a computer reservation system to perform a particular task for a customer. In a conversational request, the gateway process 50 maintains a connection between a particular client application 20 and a computer reservation system during multiple API calls. A client application 20 thus makes multiple API calls to gateway process 50 during a conversational request. For each API call made by a client application 20 during a conversational request, gateway process 50 makes one or more requests to a computer reservation system and receives one or more datasets in response to these requests.

An example of a conversational request is the booking of a round-trip airline ticket. Separate API calls might be required for choosing the outbound leg of the trip (airline, date, and time), making a seat selection for the outbound leg, choosing the return leg of the trip (airline, date, and time) and making a seat selection for the return leg of the trip.

It should be understood that a single API call may lead to multiple requests to a computer reservation system. For example, in the first example discussed above, a user was requesting the available flight information for a particular set of two preferred airlines. If the travel agent were to make such a request on a computer reservation system, the seven flights available may not fit on a single screen. If, for example, only three airlines could be displayed on one screen, then the user would twice have to issue a request to the computer reservation system for the next screen of information. The invention avoids the need for the user to issue multiple requests in this situation. Instead, a transactor script 56 issues multiple requests to the computer reservation system until it has received the data for all seven airlines. Then, the transactor script 56 returns the appropriate data to the client application 20.

This feature of the invention is especially useful in another context. Often, a computer reservation system will require a user attempting to obtain a certain piece of information to enter various options which are displayed in a predefined sequence. Here, the client application 20 can be designed to have sophisticated commands indicating which options are to be selected. The user of the client application 20 can thus issue a single command rather than several. The application program interface then makes multiple requests to the computer reservation system. These requests specify the various options and finally the API returns the appropriate data to the client application 20. This feature of the invention increases the efficiency of a user of the system by reducing the number of commands that a user must type to obtain the information he desires.

Another feature of the invention is the ability to make multiple simultaneous calls to a computer reservation system. This feature of the invention can best be understood by describing an example. Often, a travel agent will desire to obtain simultaneously the availability of an airline flight, a hotel room, and a rental car. The invention allows the user to request these pieces of information simultaneously. The user generates a single command requesting this information using client application 20. When an application program interface in gateway process 50 receives such a command, it sets up multiple sessions with a computer reservation system. In this example, it would establish three sessions, each of these three sessions employing a different terminal address for the computer reservation system. Using one of the sessions, it would obtain the availability of the airline flight. Using a second session, it would obtain the information regarding the hotel room. Finally, using the third session, it would receive the information regarding the rental car. Gateway process 50 then normalizes all of this data and simultaneously returns it in normalized form to a client application 20.

This feature of the invention is made possible because gateway process 50 is responsible for dynamically allocating terminal addresses for the computer reservation systems to client applications making calls to the gateway process 50. For each computer reservation system, the gateway maintains a pool of terminal addresses. The gateway process 50 is responsible for (1) establishing a CRS session in response to a command received from a client application 20, (2) issuing the appropriate request(s) to the computer reservation system, and (3) signing off after data has been received in response to the request. In response to a transactional request, the gateway process 50 signs off immediately. In response to a conversational request, the gateway process sends a session identifier to the client application 20 and the gateway process 50 maintains the session with the computer reservation system until the client application 20 has completed the conversational request.

This aspect of the invention has an additional advantage. Besides making simultaneous use of multiple terminal addresses if they are available, the gateway process 50 may efficiently allocate terminal addresses to a particular client application 20. Because gateway process 50 controls a pool of terminal addresses, a travel agency need not obtain a terminal address for each client computer 12. Thus, the travel agency pays for less terminal addresses than it would otherwise. Also, because the user of client application 20 may not care how a particular reservation is made, gateway process 50 can choose to direct a request to a particular computer reservation system on the basis of which computer reservation systems currently have terminal addresses available. Thus, gateway process 50 makes efficient use of the available connections to various computer reservation systems.

Figure 5:
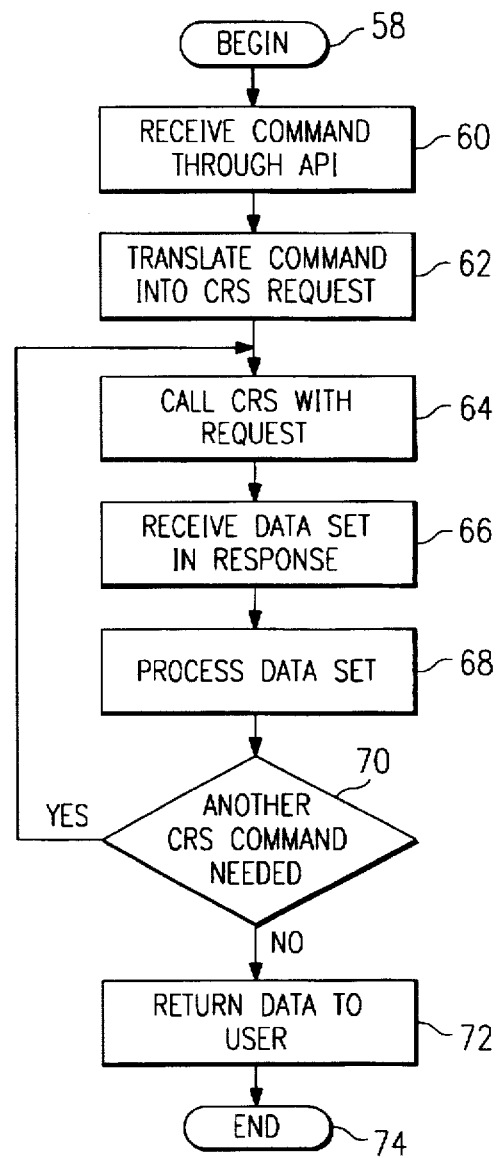
FIG. 5 illustrates a flow chart of the operation of the invention.

FIG. 5 illustrates a flow chart of an application program interface call by a client application 20 to gateway process 50. The process begins at step 58 when a client application 20 generates a command. In step 60, gateway process 50 receives the command through an application program interface. Next, in step 62, a transform script 54 translates the command into an appropriate CRS request. In step 64, transactor script 56 calls the computer reservation system with the request. Then, in step 66, the transactor script 56 receives a dataset in response to the request.

In step 68, the transactor script 56 may process the dataset. It is in this step that filtering of the data may be performed. Next, a decision is made at step 70 whether another CRS command is needed. Another CRS command may be needed where multiple requests must be generated to the computer reservation system to obtain all of the data requested by the user. Examples of this need are discussed above. If another command is needed, the process returns to step 64. If another command is not needed, data is returned to the user in step 72 and the process terminates at step 74. If the data returned to the user is to be normalized, it is normalized in step 72.

It should be understood that the invention is not limited to the illustrated structures and that a number of substitutions can be made without departing from the scope and teachings of the present invention. For example, in computer network 10, client application 20 and gateway application 22 run on separate computers. Alternatively, client application 20 and gateway application 22 could run on a single computer. As discussed above, the invention can be used to interface with a host system and for purposes of this application a host system is considered to be a computer reservation system.

The invention is not limited to travel reservations. The invention could be used for other types of reservation systems such as entertainment reservation systems for purchasing such items as concert tickets, museum tickets, movie tickets, national and state park admission tickets, circus tickets, etc.

The software processes illustrated in FIGS. 3 and 4 and the application program interface functionally described in connection with FIG. 5 are only examples and other topologies could be used to implement the present invention. The data received from a computer reservation system could be any type of data. The term "reservation data" refers to any kind of data received from a computer reservation system for purposes of this application.

Although the present invention has been described in detail, it should be understood that various changes, substitutions, and alterations can be made hereto without departing from the spirit and scope of the invention as defined by the appended claims.

What is claimed is:

1. A reservation system, comprising:
  a client application running on a first client computer and operable to generate a command comprising an application program interface call specifying desired reservation data;
  a server gateway application running on a first server computer wherein the first server computer is a different computer than the first client computer, the server application comprising
    a first computer reservation system interface connected to a first computer reservation system;
    a normalization module comprising a plurality of application program interfaces, at least one application program interface operable to process the command, to interact with the first computer reservation system through the first computer reservation system interface, and to receive a first set of reservation data responsive to the command from the first computer reservation system, the at least one application program interface further operable to return selected portions of the first set of reservation data comprising the desired reservation data to the client application in a normalized format, and to facilitate selection from the desired reservation data.

2. The reservation system of claim 1, further comprising:
a computer network connecting the client application to the server gateway application.

3. The reservation system of claim 2, further comprising:
a first frame relay access device connected to the computer network and operable to connect the first computer reservation system interface to the first computer reservation system.

4. The reservation system of claim 2, further comprising:
a modem connected to the first server computer and operable to connect the first computer reservation system interface to the first computer reservation system.

5. The reservation system of claim 2, further comprising at least one additional server computer and at least one additional client computer, each of the server computers operable to process commands generated by the client computers and addressed to that particular server.

6. The reservation system of claim 1, wherein the at least one application program interface is further operable to generate a plurality of requests to the first computer reservation system in response to the command and receive a plurality of data sets in response to the plurality of requests, the at least one application program interface further operable to process the plurality of data sets and return selected portions thereof to the client application in a normalized format.

7. The reservation system of claim 6, wherein the number of requests generated to the first computer reservation system in response to the command depends upon parameters contained in the command.

8. The reservation system of claim 6, wherein the number of requests generated to the first computer reservation system in response to the command depends upon parameters contained in the command and upon the values of data in the data sets received in response to earlier requests to the first computer reservation system generated in response to the command.

9. The reservation system of claim 1 wherein the first computer reservation system comprises a travel reservation system operable to allow a user to receive information about and make reservations for airlines, hotels, and rental cars.

10. A reservation system, comprising:
a client application running on a first client computer and operable to generate a command comprising an application program interface call specifying desired reservation data;
a server gateway application running on a first server computer wherein the first server computer is a different computer than the first client computer, the server application comprising
a first computer reservation system interface connected to a first computer reservation system;
a normalization module comprising a plurality of application program interfaces, at least one application program interface operable to process the command and interact with the first computer reservation system through the first computer reservation system interface, the at least one application program interface further operable to generate a plurality of requests to the first computer reservation system in response to the command and receive a plurality of data sets in response to the plurality of requests, the plurality of data sets including the desired reservation data, the at least one application program interface further operable to process the plurality of data sets and return them to the client application in a normalized format to facilitate selection from the desired reservation data.

11. The reservation system of claim 10, further comprising:
a computer network connecting the client application to the server gateway application.

12. The reservation system of claim 11, further comprising:
a first frame relay access device connected to the computer network and operable to connect the first computer reservation system interface to the first computer reservation system.

13. The reservation system of claim 11, further comprising:
a modem connected to the first server computer and operable to connect the first computer reservation system interface to the first computer reservation system.

14. The reservation system of claim 11, further comprising at least one additional server computer and at least one additional client computer, each of the server computers operable to process commands generated by the client computers and addressed to that particular server.

15. The reservation system of claim 10, wherein the normalization module only returns selected portions of the plurality of data sets to the client application in a normalized format.

16. The reservation system of claim 10 wherein the first computer reservation system comprises a travel reservation system operable to allow a user to receive information about and make reservations for airlines, hotels, and rental cars.

17. The reservation system of claim 10, wherein the number of requests generated to the first computer reservation system in response to the command depends upon parameters contained in the command.

18. The reservation system of claim 10, wherein the number of requests generated to the first computer reservation system in response to the command depends upon parameters contained in the command and upon the values of data in the data sets received in response to earlier requests to the first computer reservation system generated in response to the command.

19. A method for interacting with a computer reservation system comprising:
generating a command comprising an application program interface call specifying desired reservation data on a first client computer in response to user input;
receiving the command on a first server computer, wherein the first server computer is a different computer than the first client computer;
generating a first request to a first computer reservation system using an application program interface responsive to the command;
receiving a first set of reservation data from the first computer reservation system in response to the first request;
normalizing and returning selected portions of the first set of reservation data to the first client computer, the selected portions of the first set of reservation data comprising the desired reservation data; and
presenting the desired reservation data to the user for selection from the reservation data presented.

20. The method of claim 19, wherein the generating step further comprises generating a plurality of requests to the first computer reservation system in response to the command;
wherein the receiving step further comprises receiving a plurality of data sets in response to the plurality of requests; and wherein the normalizing step further comprises normalizing and returning selected portions of the plurality of data sets to the first client computer.

21. The method of claim 20 wherein the number of requests generated to the first computer reservation system in response to the command depends upon parameters contained in the command.

22. The method of claim 20, wherein the number of requests generated to the first computer reservation system in response to the command depends upon parameters contained in the command and upon the values of data in the data sets received in response to earlier requests to the first computer reservation system generated in response to the command.

23. The method of claim 19, wherein the first computer reservation system comprises a travel reservation system operable to allow a user to receive information about and make reservations for airlines, hotels, and rental cars.

24. A method for interacting with a computer reservation system comprising:

generating a command comprising an application program interface call specifying desired reservation data on a first client computer in response to user input;

receiving the command on a first server computer, wherein the first server computer is a different computer than the first client computer;

generating a plurality of requests to a first computer reservation system in response to the command and using an application program interface responsive to the command;

receiving a plurality of data sets from the first computer reservation system in response to the plurality of requests, the plurality of data sets including the desired reservation data;

normalizing and returning the plurality of data sets to the first client computer; and presenting the data sets to the user for selection from the desired reservation data.

25. The method of claim 24, wherein the normalization step further comprises normalizing and returning only selected portions of the plurality of data sets to the first client computer.

26. The method of claim 24 wherein the number of requests generated to the first computer reservation system in response to the command depends upon parameters contained in the command.

27. The method of claim 24, wherein the number of requests generated to the first computer reservation system in response to the command depends upon parameters contained in the command and upon the values of data in the data sets received in response to earlier requests to the first computer reservation system generated in response to the command.

* * * * *